US010689107B2

(12) United States Patent
Baracaldo Angel et al.

(10) Patent No.: US 10,689,107 B2
(45) Date of Patent: Jun. 23, 2020

(54) DRONE-BASED SMOKE DETECTOR

(71) Applicant: INTERNATIONAL BUSINESS MACHINES CORPORATION, Armonk, NY (US)

(72) Inventors: Nathalie Baracaldo Angel, San Jose, CA (US); Sandeep Gopisetty, Morgan Hill, CA (US); Heiko H. Ludwig, San Francisco, CA (US); David M. Ungar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 15/497,084

(22) Filed: Apr. 25, 2017

(65) Prior Publication Data

US 2018/0305010 A1    Oct. 25, 2018

(51) Int. Cl.
*B64C 39/02* (2006.01)
*G05D 1/06* (2006.01)
(Continued)

(52) U.S. Cl.
CPC ........... *B64C 39/024* (2013.01); *F16M 11/18* (2013.01); *F16M 13/027* (2013.01);
(Continued)

(58) Field of Classification Search
CPC .............. B64C 39/024; B64C 2201/12; G05D 1/0676; G05D 1/0033; G05D 1/0011;
(Continued)

(56) References Cited

U.S. PATENT DOCUMENTS

| 5,926,820 A | 7/1999 | Agrawal et al. |
| 7,059,566 B2 * | 6/2006 | Byers ...................... B64C 1/061 244/119 |

(Continued)

FOREIGN PATENT DOCUMENTS

| CN | 203773355 U | 8/2014 |
| EP | 2003057 A2 | 12/2008 |

(Continued)

OTHER PUBLICATIONS

Barnier, N. et al., "4D-Trajectory Deconfliction Through Departure Time Adjustment", Proceedings of the Eighth USA/Europe Air Traffic Management Research & Development Seminar, Jun. 2009, pp. 1-10, United States.

(Continued)

*Primary Examiner* — Jaime Figueroa
(74) *Attorney, Agent, or Firm* — Sherman IP LLP; Kenneth L. Sherman; Hemavathy Perumal

(57) ABSTRACT

One embodiment provides a method comprising receiving a request to release a utility holder detachably mounted to a surface mount. The utility holder maintains a utility payload. A set of rotatable holding brackets is coupled to the surface mount in a pivotable fashion to engage the holding brackets with the utility holder in order to mount the utility holder to the surface mount. The method further comprises, in response to receiving the request, powering on a drone attached to the utility holder, and releasing the utility holder from the surface mount by actuating rotation of the holding brackets to disengage the holding brackets from the utility holder, enabling the drone to transport the utility holder from the surface mount to a desired location.

11 Claims, 13 Drawing Sheets

(51) Int. Cl.

| | | |
|---|---|---|
| *F16M 11/18* | (2006.01) | |
| *G08B 17/10* | (2006.01) | |
| *G05D 1/00* | (2006.01) | |
| *F16M 13/02* | (2006.01) | |
| *G08B 5/36* | (2006.01) | |
| *G08B 3/10* | (2006.01) | |
| *G08B 25/10* | (2006.01) | |
| *G08B 5/38* | (2006.01) | |

(52) U.S. Cl.
CPC ......... *G05D 1/0011* (2013.01); *G05D 1/0033* (2013.01); *G05D 1/0676* (2013.01); *G08B 3/10* (2013.01); *G08B 5/36* (2013.01); *G08B 5/38* (2013.01); *G08B 17/10* (2013.01); *G08B 25/10* (2013.01); *B64C 2201/12* (2013.01)

(58) Field of Classification Search
CPC ........ F16M 11/18; F16M 13/027; G08B 5/38; G08B 25/10; G08B 3/10; G08B 5/36; G08B 17/10
USPC .......................................................... 700/245
See application file for complete search history.

(56) References Cited

U.S. PATENT DOCUMENTS

| | | | |
|---|---|---|---|
| 7,512,462 B2 | 3/2009 | Nichols | |
| 7,925,393 B2 | 4/2011 | Bolt, Jr. | |
| 8,038,097 B1 | 10/2011 | Monson et al. | |
| 8,082,102 B2 | 12/2011 | Ravenscroft | |
| 8,164,485 B2 | 4/2012 | Prinzel, III et al. | |
| 8,234,068 B1 | 7/2012 | Young et al. | |
| 8,290,696 B1 | 10/2012 | Sridhar et al. | |
| 8,417,708 B2 | 4/2013 | Chidlovskii et al. | |
| 8,543,265 B2 | 9/2013 | Ekhaguere et al. | |
| 8,560,148 B2 | 10/2013 | Torres | |
| 8,660,985 B2 | 2/2014 | Wang et al. | |
| 8,776,074 B1 | 7/2014 | Heisler et al. | |
| 8,818,696 B2 | 8/2014 | Klooster | |
| 8,825,366 B2 | 9/2014 | Giovannini et al. | |
| 8,843,303 B1 | 9/2014 | Young et al. | |
| 8,914,182 B2 | 12/2014 | Casado et al. | |
| 8,924,137 B2 | 12/2014 | Chan | |
| 8,942,914 B2 | 1/2015 | Subbu | |
| 9,014,880 B2 | 4/2015 | Durling | |
| 9,056,676 B1 | 6/2015 | Wang | |
| 9,069,104 B2 | 6/2015 | Datta et al. | |
| 9,075,415 B2 | 7/2015 | Kugelmass | |
| 9,087,452 B2 | 7/2015 | Del Pozo De Poza | |
| 9,120,568 B2 | 9/2015 | Herman et al. | |
| 9,171,473 B1 | 10/2015 | McNally et al. | |
| 9,334,052 B2 | 5/2016 | Pasko et al. | |
| 9,417,070 B1 | 8/2016 | Herriot | |
| 9,499,265 B2 | 11/2016 | Sanz et al. | |
| 9,513,125 B2 | 12/2016 | Ravenscroft | |
| 9,558,670 B1 | 1/2017 | Sheth et al. | |
| 9,583,006 B2 | 2/2017 | Srivastava | |
| 9,607,520 B2 | 3/2017 | McCann et al. | |
| 9,668,146 B2 | 5/2017 | Lau | |
| 9,671,790 B2 | 6/2017 | Srivastava et al. | |
| 9,671,791 B1 | 6/2017 | Paczan et al. | |
| 9,764,836 B1 | 9/2017 | Elzinga et al. | |
| 9,841,757 B2 | 12/2017 | Mikan et al. | |
| 9,915,956 B2 * | 3/2018 | Bokeno ................. B64C 39/024 | |
| 9,928,749 B2 * | 3/2018 | Gil ........................... B64F 1/02 | |
| 9,959,771 B1 | 5/2018 | Carlson et al. | |
| 10,232,938 B2 * | 3/2019 | Yates ..................... B64C 39/024 | |
| 10,336,453 B2 * | 7/2019 | Chan ........................ B64D 1/08 | |
| 2005/0006525 A1 * | 1/2005 | Byers ...................... B64C 1/061 244/118.1 | |
| 2006/0293840 A1 | 12/2006 | Klein | |
| 2007/0005550 A1 | 1/2007 | Klein | |
| 2007/0129855 A1 | 6/2007 | Coulmeau | |
| 2008/0154486 A1 | 6/2008 | Coulmeau | |
| 2009/0050750 A1 | 2/2009 | Goossen | |
| 2010/0049382 A1 | 2/2010 | Akalinili et al. | |
| 2010/0163621 A1 | 7/2010 | Ben-Asher et al. | |
| 2012/0143482 A1 | 6/2012 | Goossen et al. | |
| 2012/0175468 A1 | 7/2012 | Zerof | |
| 2014/0032034 A1 | 1/2014 | Raptopoulos et al. | |
| 2014/0217230 A1 * | 8/2014 | Helou, Jr. ............... B64C 25/14 244/17.17 | |
| 2014/0222248 A1 | 8/2014 | Levien et al. | |
| 2014/0319272 A1 | 10/2014 | Casado Magana et al. | |
| 2015/0130621 A1 | 5/2015 | Seiler | |
| 2015/0158587 A1 * | 6/2015 | Patrick .................. B64C 39/024 244/137.4 | |
| 2015/0181819 A1 | 7/2015 | Celebi et al. | |
| 2015/0183528 A1 | 7/2015 | Walsh et al. | |
| 2015/0246727 A1 | 9/2015 | Masticola et al. | |
| 2015/0379874 A1 | 12/2015 | Ubhi et al. | |
| 2016/0093217 A1 | 3/2016 | Hale et al. | |
| 2016/0117929 A1 | 4/2016 | Chan | |
| 2016/0117933 A1 | 4/2016 | Chan | |
| 2016/0125740 A1 | 5/2016 | Pasko et al. | |
| 2016/0185466 A1 | 6/2016 | Dreano | |
| 2016/0200438 A1 * | 7/2016 | Bokeno ................. B64C 39/024 | |
| 2016/0225263 A1 | 8/2016 | Salentiny et al. | |
| 2016/0240091 A1 | 8/2016 | Thiele | |
| 2016/0257423 A1 | 9/2016 | Martin et al. | |
| 2016/0275801 A1 | 9/2016 | Kopardekar et al. | |
| 2016/0285664 A1 | 9/2016 | Canavor et al. | |
| 2016/0356922 A1 | 12/2016 | McCann et al. | |
| 2016/0364989 A1 * | 12/2016 | Speasl ..................... G06Q 10/08 | |
| 2017/0015415 A1 * | 1/2017 | Chan ..................... B64C 39/024 | |
| 2017/0045894 A1 | 2/2017 | Canoy et al. | |
| 2017/0050748 A1 | 2/2017 | Byers et al. | |
| 2017/0081026 A1 | 3/2017 | Winn et al. | |
| 2017/0081043 A1 | 3/2017 | Jones et al. | |
| 2017/0096075 A1 | 4/2017 | Henry et al. | |
| 2017/0187993 A1 | 6/2017 | Martch et al. | |
| 2017/0193041 A1 | 7/2017 | Fuchs et al. | |
| 2017/0203857 A1 | 7/2017 | O'Toole | |
| 2017/0242887 A1 | 8/2017 | Zhao et al. | |
| 2017/0242889 A1 | 8/2017 | Zhao et al. | |
| 2017/0313421 A1 * | 11/2017 | Gil ............................ B64D 1/00 | |
| 2017/0316701 A1 | 11/2017 | Gil et al. | |
| 2017/0349376 A1 | 12/2017 | Porat | |
| 2018/0295327 A1 * | 10/2018 | Yearwood ............. B64C 39/024 | |
| 2018/0312252 A1 * | 11/2018 | Yates ...................... B64C 31/02 | |

FOREIGN PATENT DOCUMENTS

| | | |
|---|---|---|
| WO | 9621208 | 7/1996 |
| WO | 2015157883 A1 | 10/2015 |

OTHER PUBLICATIONS

List of IBM Patents or Applications Treated as Related.
List of IBM Patents or Patent Applications Treated as Related Form.
Schilke, C. et al., "Dynamic Route Optimization Based on Adverse Weather Data", SESARWPE, Fourth SESAR Innovation Dats, Nov. 25-27, 2014, 8 pages (Year:2014).
List of IBM Patents or Applications Treated as Related; Blomberg, J.L., U.S. Appl. No. 16/427,180, filed May 30, 2019.
Sinha, S., "Cable plant repair via drones", Sep. 5, 2015, pp. 1-13, United States, [downloaded from https://www.cablelabs.com/wp-content/uploads/2015/04/60819-Cable_plant_repair_via_drones.pdf].
Frey, F.T., "192 Future Uses for Flying Drones", Sep. 2, 2014, pp. 1-17, Futurist Speaker, United States.
Torres, S. et al., "An Integrated Approach to Air Traffic Management to Achieve Trajectory Based Operations", Proceedings of the 2012 IEEE/AIAA 31st Digital Avionics Systems Conference (DASC), Oct. 14-18, 2012, pp. 1-35, IEEE, United States.
Mueller, E.R. et al., "4-D Operational Concepts for UAV/ATC Integration", Proceedings of the 2nd AIAA "Unmanned Unlimited" Systems, Technologies, and Operations—Aerospac, Sep. 15-18, 2003, pp. 1-11, United States.

(56) References Cited

OTHER PUBLICATIONS

Jardin, M.R,, "Real-Time Conflict-Free Trajectory Optimization", Proceedings of the 5th USA/Europe ATM 2003 R&D Seminar, Jun. 23-27, 2003, pp. 1-10, Budapest, Hungary.

Jardin, M.R., "Grid-Based Strategic Air Traffic Conflict Detection", Proceedings of the AIAA Guidance, Navigation, and Control Conference and Exhibit, Aug. 15-18, 2005, pp. 1-11, United States.

Erzberger, H., "Automated Conflict Resolution for Air Traffic Control", Proceedings of the 25th International Congress of the Aeronautical Sciences (ICAS'06), Sep. 3-8, 2006, pp. 1-27, Hamburg, Germany.

Torres, S. et al., "An Integrated Approach to Air Traffic Management to Achieve Trajectory Based Operations", Proceedings of the 2012 IEEE/AIAA 31st Digital Avionics Systems Conference (DASC), Oct. 14-18, 2012, pp. 3E6-1-3E6-16, IEEE, United State.

Chaimatanan, S., "Strategic planning of aircraft trajectories", Ph.D. Thesis, Optimization and Control, Sep. 16, 2014, pp. 1-113, Universite Paul sabatier, France.

Gekht, D. et al., "Tactical Re-planning within the 4D Contracts ATC Concept", Proceedings of the AIAA Guidance, Navigation, and Control (GNC) Conference, Aug. 19-22, 2013, pp. 1-27, United States.

Tech Insider, "Tokyo Police Snatch Illegal Drones Out of the Sky", Non-Military & Commerical UAS, Dec. 31, 2015, pp. 1-8, UAS Vision [downloaded from http://www.uasvision.com/2015/12/31/tokyo-police-snatch-illegal-drones-out-of-the-sky/?utm_source=Newsletter&utm_campaign=75474ff106-RSS_EMAIL_CAMPAIGN&utm_medium=email&utm_term=0_799756aeb7-75474ff106-297573481 on Feb. 23, 2016].

Arkin, E.M. et al., "On the Reflexivity of Point Sets", Discrete and Computational Geometry, 2003, pp. 139-156, vol. 25, Springer Berlin Heidelberg, Germany.

Wolf, H.G., "Unmanned Aircraft Systems Integration into the National Airspace", Proceedings of the IEEE Aerospace Conference, Mar. 2-9, 2013, pp. 1-16, IEEE, United States.

Smith, C.Y. et al., "2025 Aerospace Replenishment: The Insidious Force Multiplier." White Papers vol. 2 Reach and Presence, Oct. 1996, pp. 1-37, Air University, United States.

Garone, E. et al., "Generalized traveling salesman Problem for Carrier-Vehicle Systems", Journal of Guidance, Control, and Dynamics, 2014, pp. 766-774, vol. 37, No. 3, Aerospace Research Central, United States (Abstract only).

Mathew, N. et al., "Planning Paths for Package Delivery in Heterogeneous Multirobot Teams", Proceedings of the IEEE Transactions on Automation Science and Engineering, Oct. 2, 2015, pp. 1298-1308, vol. 12, No. 4, IEEE, United States.

Savuran, H. et al., "Route Optimization Method for Unmanned Air Vehicle Launched from a Carrier", Lecture Notes on Software Engineering, Nov. 2015, pp. 1-6, vol. 3, No. 4, United States.

Sole, M. et al., "Dynamic Flight Plan Design for UAS Remote Sensing Applications", Proceedings of the 48th AIAA Aerospace Sciences Meeting Including the New Horizons Forum and Aerospace Exposition, Jan. 4-7, 2010, pp. 1-23, American Institute of Aeronautics and Astronautics, United States.

Control Systems Technology Group, "The Whole Drone Package System Concept", Oct. 21, 2014, pp. 1-6, Control Systems Technology Group Wiki, United States [downloaded from http://cstwiki.wtb.tue.nl/index.php?title=The_Whole_Drone_Package_System_Concept].

Software Patent Institute et al., "Execution Environments in Programming Languages and Operation Systems", May 31, 1982, pp. 1-179, Department of Computer Science, Carnegie-Mellon University, United States.

Software Patent Institute et al., "An Overview of KRL, a Knowledge Representation Language", Jul. 1, 1976, pp. 1-35, Xerox Palo Alto Research Center, IP.com, United States.

DroneDeploy—Simple Fast Drone Software for Business, May 10, 2013, pp. 1-8, United States [https://www.dronedeploy.com/, originally accessed Mar. 24, 2015, downloaded on Aug. 25, 2015].

Simonite, T., "Air Traffic Control for Drones", Oct. 17, 2014, pp. 1-3, MIT Technology Review, United States.

Steele, B., "NASA's air traffic control system for drones is progressing nicely", Mar. 21, 2015, pp. 1-6, Excelis Inc., United States.

Closson, K., "Air Traffic Control . . . For Drones", Nov. 21, 2014, pp. 1-4, Nerac.com, United States.

Kayayurt, B. et al., "Application of Stanag 4586 Standard for Turkish Aerospace Industries UAV Systems", Proceedings of 32nd IEEE/AIAA Digital Avionics Systems Conference (DASC), Oct. 5-10, 2013, pp. 1-7, IEEE, United States.

Anonymously, "Collision Avoidance for UAVs Using Simulated ADS-B Data", Apr. 6, 2015, pp. 1-3, IP.com, United States.

Anandappan, T. et al., "A Method to Secure Air to Air Messages", Feb. 23, 2015, pp. 1-7, IP.com, United States.

Anonymously, "Crash controller for unmanned aerial vehicles", Dec. 2, 2014, pp. 1-4, IP.com, United States.

List of IBM Patents or Patent Applications Treated As Related; Butler, Eric K., U.S. Appl. No. 16/588,920, filed Sep. 30, 2019.

\* cited by examiner

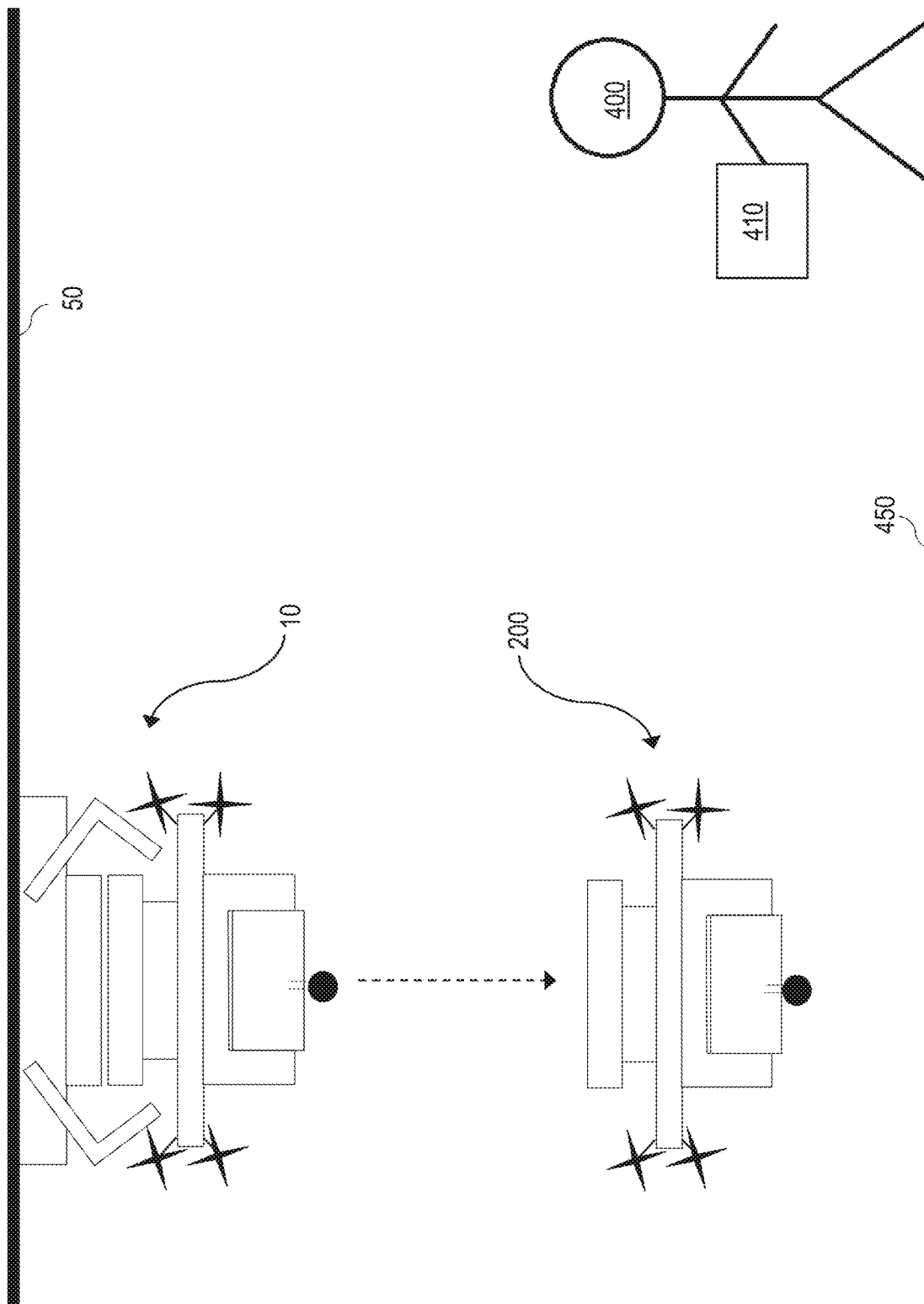

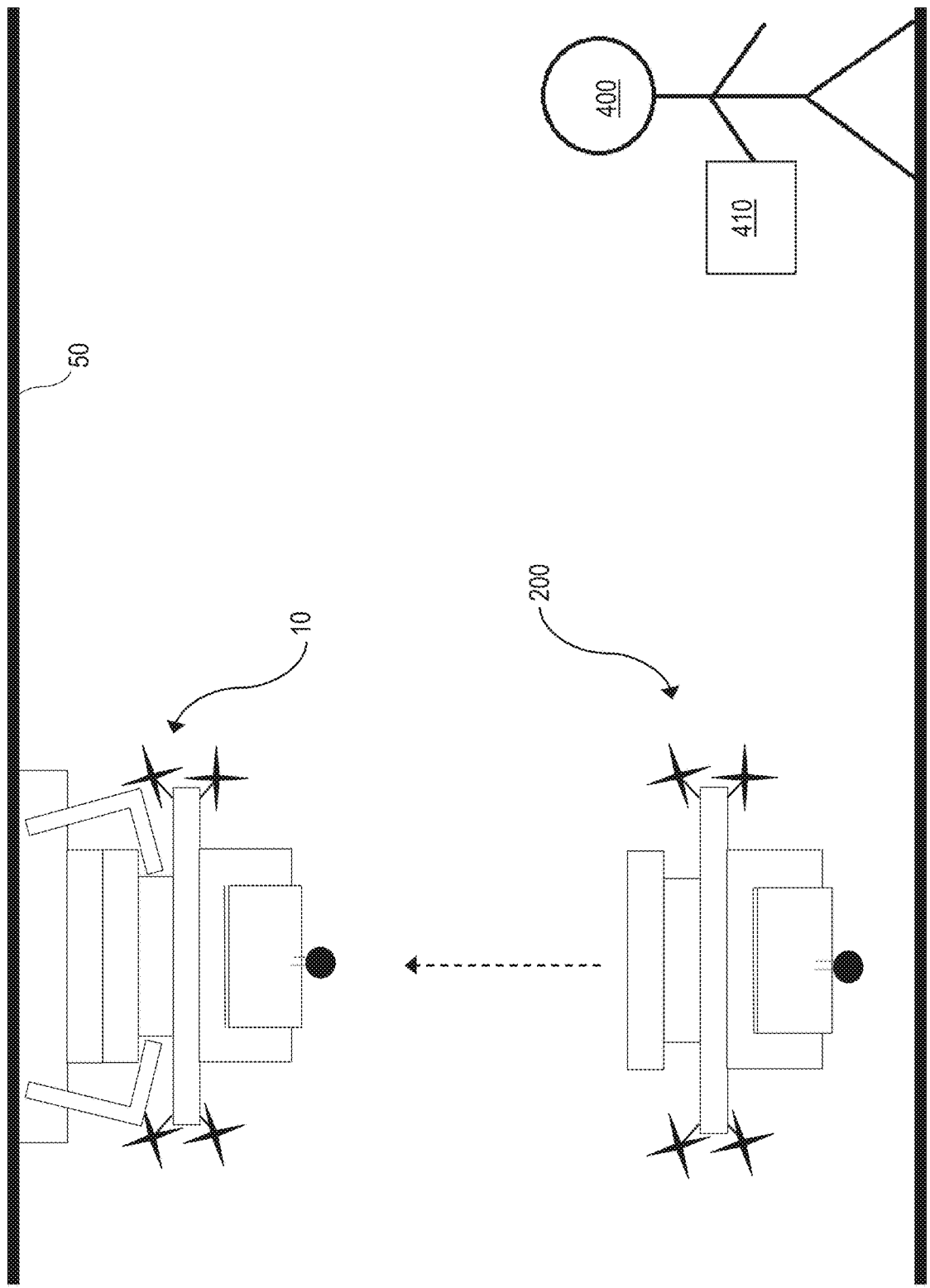

DRONE-BASED SMOKE DETECTOR

The present invention generally relates to detectors, and more particularly, to a drone-based smoke detector.

BACKGROUND

A smoke detector (i.e., a smoke alarm) is a device that detects (i.e., senses) smoke and issues a local audible or visual alarm in response to detecting smoke. Smoke detectors in large commercial, industrial, and residential buildings are typically powered by a central fire alarm system that is powered by building power with a battery backup. Domestic smoke detectors range from individual battery-powered units to several interlinked mains-powered units with battery backup.

SUMMARY

One embodiment provides a method comprising receiving a request to release a utility holder detachably mounted to a surface mount. The utility holder maintains a utility payload. A set of rotatable holding brackets is coupled to the surface mount in a pivotable fashion to engage the holding brackets with the utility holder in order to mount the utility holder to the surface mount. The method further comprises, in response to receiving the request, powering on a drone attached to the utility holder, and releasing the utility holder from the surface mount by actuating rotation of the holding brackets to disengage the holding brackets from the utility holder, enabling the drone to transport the utility holder from the surface mount to a desired location.

Another embodiment provides a method comprising detecting physical contact between a first coupling member of a surface mount and a second coupling member of a utility holder when a drone transports the utility holder to the surface mount. The first coupling member attracts the second coupling member to couple the utility holder to the surface mount when the coupling members are within proximity of each other. The method further comprises, in response to detecting the physical contact between the coupling members, mounting the utility holder to the surface mount by actuating rotation of a set of rotatable holding brackets coupled to the surface mount in a pivotable fashion in order to engage the holding brackets with the utility holder. One or more input/output (I/O) connectors of the surface mount and the utility holder are mated to transmit signals between the surface mount to the utility holder, and the drone is powered off.

One embodiment provides an apparatus comprising a surface mount, a utility holder detachably mounted to the surface mount, and a drone attached to the utility holder. The surface mount comprises a base unit affixable to a mounting surface, a first coupling member, and a set of rotatable holding brackets coupled to the base unit in a pivotable fashion in order to engage the holding brackets with the utility holder. The utility holder comprises a utility payload, a second coupling member, and a holder member. The first coupling member attracts the second coupling member to couple the utility holder to the base unit when the coupling members are within proximity of each other. The holding brackets are rotatable to a first position to engage with the holder member to lock the utility holder to the base unit and mount the utility holder to the surface mount. The holding brackets are further rotatable to a second position to disengage from the holder member and release the utility holder from the surface mount. The drone is pilotable to transport the utility holder to the surface mount to mount the utility holder to the surface mount. The drone is further pilotable to transport the utility holder from the surface mount to a desired location when the utility holder is released from the surface mount.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 illustrates descent of a drone after the U&D assembly is released/unlocked from the mounting surface assembly, in one or more embodiments;

FIG. 6 illustrates ascent of the drone to lock the U&D assembly to the mounting surface assembly, in one or more embodiments;

Figure 1A:
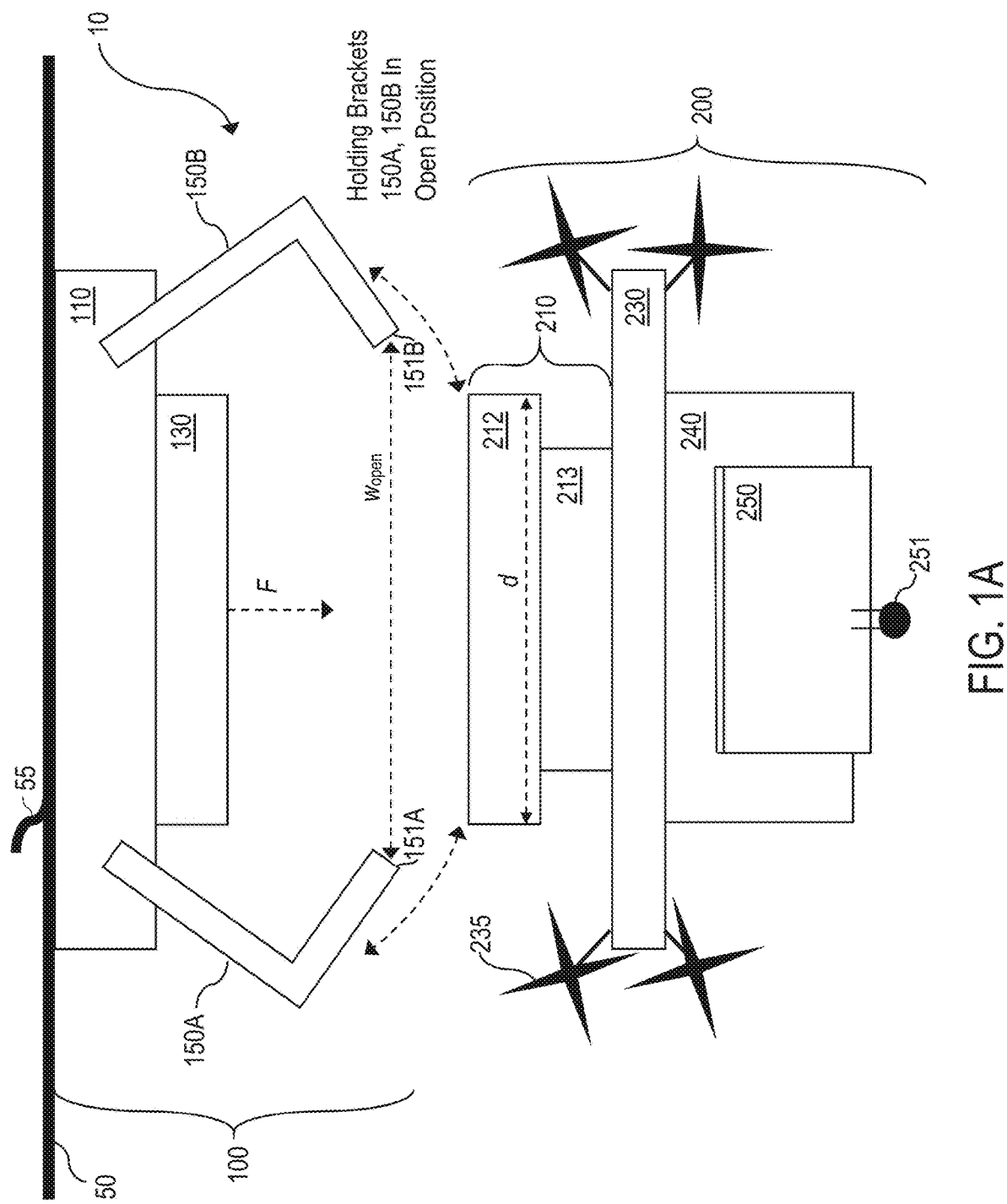
FIG. 1A illustrates an example drone-based utility apparatus, in accordance with one or more embodiments.

The detailed description explains the preferred embodiments of the invention, together with advantages and features, by way of example with reference to the drawings.

DETAILED DESCRIPTION

The present invention generally relates to smoke detectors, and more particularly, to a drone-based smoke detector. One embodiment provides a method comprising adjusting a runtime of a dataflow processing environment to operate on multiple batches of objects. The method further comprises pre-allocating one or more vectors of objects, and processing the multiple batches one at a time. The one or more vectors of objects are re-used during processing of each batch.

One embodiment provides a method comprising receiving a request to release a utility holder detachably mounted to a surface mount. The utility holder maintains a utility payload. A set of rotatable holding brackets is coupled to the surface mount in a pivotable fashion to engage the holding brackets with the utility holder in order to mount the utility holder to the surface mount. The method further comprises, in response to receiving the request, powering on a drone attached to the utility holder, and releasing the utility holder from the surface mount by actuating rotation of the holding brackets to disengage the holding brackets from the utility holder, enabling the drone to transport the utility holder from the surface mount to a desired location.

Another embodiment provides a method comprising detecting physical contact between a first coupling member of a surface mount and a second coupling member of a utility holder when a drone transports the utility holder to the surface mount. The first coupling member attracts the second coupling member to couple the utility holder to the surface mount when the coupling members are within proximity of each other. The method further comprises, in response to detecting the physical contact between the coupling members, mounting the utility holder to the surface mount by actuating rotation of a set of rotatable holding brackets coupled to the surface mount in a pivotable fashion in order to engage the holding brackets with the utility holder. One or more input/output (I/O) connectors of the surface mount and the utility holder are mated to transmit signals between the surface mount to the utility holder, and the drone is powered off.

One embodiment provides an apparatus comprising a surface mount, a utility holder detachably mounted to the surface mount, and a drone attached to the utility holder. The surface mount comprises a base unit affixable to a mounting surface, a first coupling member, and a set of rotatable holding brackets coupled to the base unit in a pivotable fashion in order to engage the holding brackets with the utility holder. The utility holder comprises a utility payload, a second coupling member, and a holder member. The first coupling member attracts the second coupling member to couple the utility holder to the base unit when the coupling members are within proximity of each other. The holding brackets are rotatable to a first position to engage with the holder member to lock the utility holder to the base unit and mount the utility holder to the surface mount. The holding brackets are further rotatable to a second position to disengage from the holder member and release the utility holder from the surface mount. The drone is pilotable to transport the utility holder to the surface mount to mount the utility holder to the surface mount. The drone is further pilotable to transport the utility holder from the surface mount to a desired location when the utility holder is released from the surface mount.

A conventional battery-operated smoke detector may require batteries that need to be replaced periodically. As batteries need to be replaced at unpredictable and often awkward times, the process of replacing batteries in a smoke detector becomes a burdensome task. Typically, a smoke detector is mounted on a ceiling as this may be the best location to detect rising smoke. For example, if the smoke detector is mounted on a high ceiling, a tall ladder may be necessary to access the smoke detector; climbing the ladder may be a dangerous task if the height between the ceiling and the ground/floor is significant.

One embodiment provides a drone-based utility apparatus.

FIG. 1A illustrates an example drone-based utility apparatus 10, in accordance with one or more embodiments. The apparatus 10 comprises a utility and drone (U&D) assembly 200 and a mounting surface assembly 100 (e.g., a ceiling assembly) that the U&D assembly 200 may be detachably coupled to. The mounting surface assembly 100 may be installed/affixed to a mounting surface 50 (e.g., the ceiling). As described in detail later herein, to mount the U&D assembly 200 to the mounting surface 50, the mounting surface assembly 100 is shaped to receive and engage with a mounting portion 210 of the U&D assembly 200 to retain/hold the U&D assembly 200.

In one embodiment, the mounting surface assembly 100 comprises a base unit 110 installed/affixed to the mounting surface 50. A coupling (i.e., connector) member 130 extends/protrudes from the base unit 110. The coupling member 130 couples the mounting portion 210 of the U&D assembly 200 to the base unit 110 when the mounting portion 210 is within proximity of the coupling member 130. As described in detail later herein, the coupling member 130 exerts/creates a force F (e.g., a magnetic force) to pull/attract the mounting portion 210 to the coupling member 130. In another embodiment, the coupling member 130 comprises another type of coupling/connection mechanism.

Figure 1B:
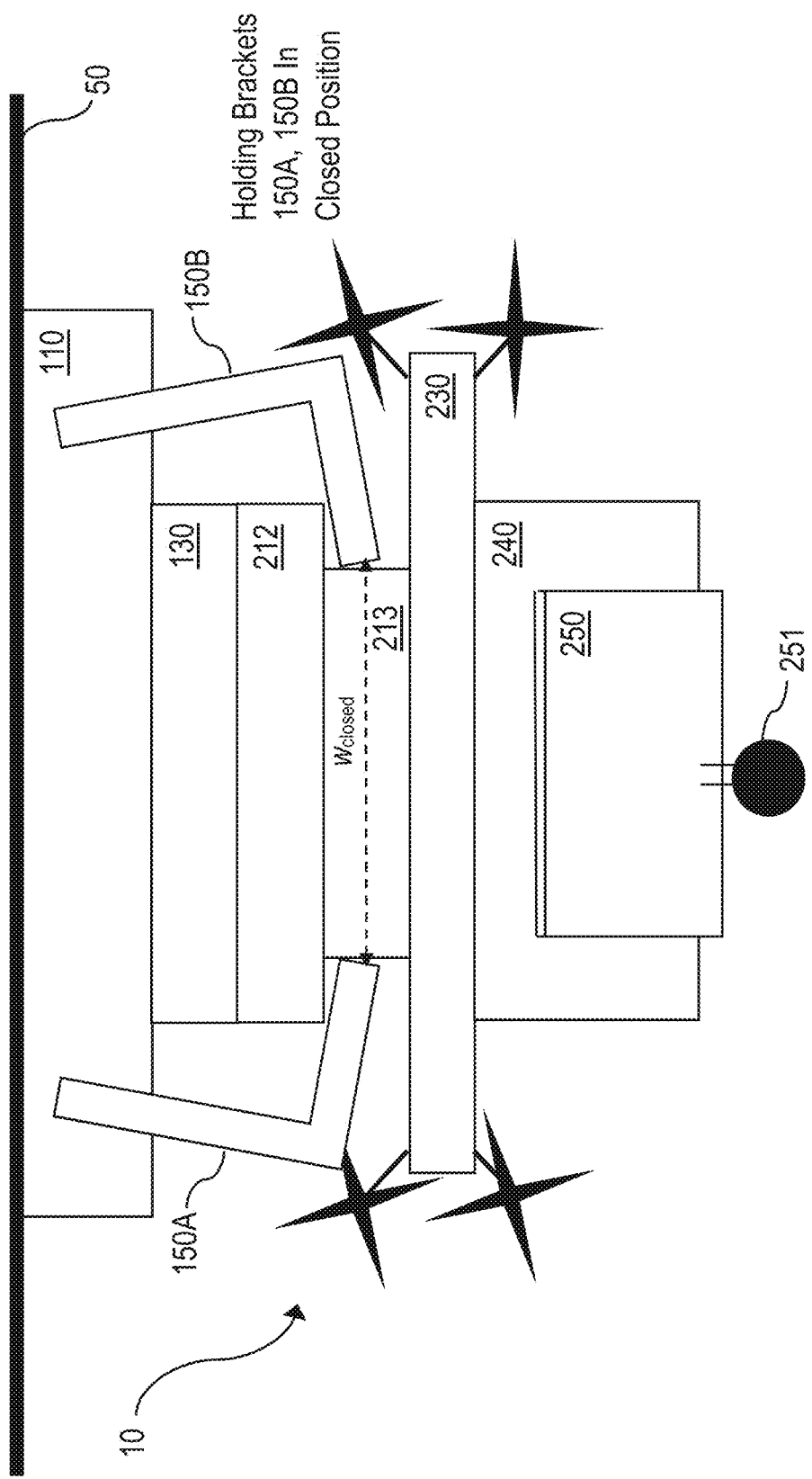
FIG. 1B illustrates a utility and drone (U&D) assembly locked to a mounting surface assembly, in accordance with one or more embodiments.

In one embodiment, the mounting surface assembly 100 comprises a pair of opposing holding brackets 150A and 150B coupled to the base unit 110 in a pivotable fashion to engage the holding brackets 150A and 150B with the U&D assembly 200. The holding brackets 150A and 150B are rotatable between different positions. As described in detail later herein, in one embodiment, the holding brackets 150A and 150B function as a locking mechanism that lock the U&D assembly 200 to the mounting surface assembly 100 when the holding brackets 150A and 150B are rotated to a first position (e.g., a lowered/closed position as shown in FIG. 1B), and release/unlock (i.e., dismount) the U&D assembly 200 from the mounting surface assembly 100 when the holding brackets 150A and 150B are rotated to a second position (e.g., a raised/open position shown in FIG. 1A).

In one embodiment, the mounting surface assembly 100 comprises a controller 120 (FIG. 2C) for controlling operation of the apparatus 100. For example, the controller 120 may control the rotation of the holding brackets 150A and 150B. In one embodiment, the controller 120 is embedded inside the base unit 110.

In one embodiment, the U&D assembly 200 comprises a drone 230 capable of flight. The drone 230 comprises a set of rotatable propellers 235 that enable the drone 230 to fly when the propellers 235 are powered. In another embodiment, instead of the drone 230, the U&D assembly 200 comprises another type of unmanned aircraft vehicle capable of flight.

In one embodiment, the U&D assembly 200 comprises a utility holder 240 for carrying (i.e., holding, maintaining, retaining, etc.) a utility payload 250. In one embodiment, the utility holder 240 is positioned below the drone 230.

Examples of different types of utility payload 250 the utility holder 240 may carry include, but are not limited to, a smoke detector, a carbon monoxide detector, etc. In one embodiment, the apparatus 10 is implemented as a drone-based smoke detector that includes, as its utility payload 250, a passive sensor 530 (FIG. 3B) for detecting smoke. The passive sensor 530 may be battery-operated.

In one embodiment, the U&D assembly 200 is configured to provide a local audible or visual alarm in response to at least one of the following: (1) the utility payload 250 detecting an event necessitating the alarm (e.g., if the utility payload 250 comprises a smoke detector, providing the alarm in response to detecting smoke), or (2) one or more components of the U&D assembly 200 requiring replacement (e.g., if the utility payload 250 comprises a battery-operated detector, providing the alarm if the batteries or the detector itself requires replacement). For example, the utility payload 250 may include an indicator light 251 that flashes to provide a visual alarm. As another example, the utility payload 250 may include a speaker (not shown) that emits a warning sound (e.g., a beep, etc.) to provide an audible alarm.

In one embodiment, the mounting portion of the U&D assembly 200 comprises a holder member 213 and a coupling member 212 extending/protruding from the holder member 213. In one embodiment, the mounting portion 210 is positioned above the drone 230.

In one embodiment, the coupling member 130 comprises a magnet. The coupling member 130 has a magnetic field that exerts/creates a magnetic force F to attract/pull the coupling member 212 when the coupling member 212 is placed within proximity of the coupling member 130 (i.e., the coupling member 212 is placed within the magnetic field). In one embodiment, the coupling member 212 comprises a magnet having a magnetic pole that is opposite that of the coupling member 130; the coupling member 130 attracts the coupling member 212 as it is opposite poled. In another embodiment, the coupling member 212 comprises a metallic connector; the coupling member 130 attracts the coupling member 212 as it is metallic.

The U&D assembly 200 is coupled to the base unit 110 when the coupling members 130 and 212 are in direct physical contact with each other. The U&D assembly 200 is uncoupled from the base unit 110 when the coupling members 130 and 212 are not in direct physical contact with each other. In another embodiment, the coupling member 130 comprises another type of coupling mechanism.

In one embodiment, the coupling members 130 and 212 have the same or substantially similar physical dimensions. When the coupling members 130 and 212 are in direct physical contact with each other, the coupling members 130 and 212 are centrally aligned, such that the U&D assembly 200 is positioned in a correct position.

Each coupling member 130, 212 may further include additional fasteners like screws, snaps, or treads that further mate mating portion 210 of the U&D assembly 210 to the base unit 110. Fasteners or any temporary mechanical connections may be used in conjunction with the coupling members 130 and 212. Each of these fasteners, including the coupling members 130 and 212, may be used alone or in combination with other connecting mechanisms.

In one embodiment, the default position of the holding brackets 150A and 150B is a raised/open position (FIG. 1A).

Let $w_{open}$ denote a width of a gap/spacing between distal ends 151A and 151B of the holding brackets 150A and 150B when the holding brackets 150A and 150B are positioned in the raised/open position. Let d denote a diameter or width of the coupling member 212 of the U&D assembly 200. In one embodiment, the width $w_{open}$ is wide enough to allow the coupling member 212 of the U&D assembly 200 to come within proximity of the coupling member 130 of the mounting surface assembly 100 (i.e., $w_{open}$>d). When the U&D assembly 200 is coupled to the base unit 110 (i.e., the coupling members 130 and 212 are in direct physical contact with each other), the controller 120 triggers simultaneous rotation of the holding brackets 150A and 150B from the raised/open position to a lowered/closed position (FIG. 1B) to engage with the holder member 213 and lock the U&D assembly 200 to the mounting surface assembly 100.

In one embodiment, the mounting surface assembly 100 is connected to a power source 55 (e.g., a power source in the ceiling). As described in detail later herein, one or more components of the mounting surface assembly 100 and/or the U&D assembly 200 is powered by the power source 55.

In one embodiment, the drone 230 is integrated with the utility holder 240 and the mounting portion 210. In another embodiment, the drone 230 is detachable from the utility holder 240 and the mounting portion 210.

The drone 230 may be manually piloted or automatically piloted. In one embodiment, manual piloting involves the use of a remote control device 410 (FIG. X) operated by a user 400 (FIG. X). For example, to couple the U&D assembly 200 to the base unit 110, the user 400 may manually pilot the drone 230 to take off from a current location (e.g., the ground/floor, a table, etc.) and ascend vertically towards the mounting surface assembly 100. When the U&D assembly 200 is uncoupled from the base unit 110 and released/unlocked from the mounting surface assembly 100 (i.e., dismounted), the user 400 may manually pilot the drone 230 to descend vertically and land at a desired landing location (e.g., the ground/floor, a table, etc.). As described in detail later herein, in one embodiment, automatic piloting involves the use of beacon-based triangulation.

FIG. 1B illustrates the U&D assembly 200 locked to the mounting surface assembly 100, in accordance with one or more embodiments. Let $w_{closed}$ denote a width of a gap/spacing between the distal ends 151A and 151B of the holding brackets 150A and 150B when the holding brackets 150A and 150B are positioned in the lowered/closed position. In one embodiment, the width $w_{closed}$ is narrow enough to allow the distal ends 151A and 151B of the holding brackets 150A and 150B to come in direct physical contact with the holder member 213 (i.e., the holding brackets 150A and 150B grip the holder member 213). Further, when the U&D assembly 200 is uncoupled from the base unit 110, the width $w_{closed}$ is narrow enough to catch and prevent the coupling member 212 from slipping through the holding brackets 150A and 150B before the U&D assembly 200 is released/unlocked from the mounting surface assembly 100 (i.e., $w_{closed}$<d).

When a request to release/unlock (i.e., dismount) the U&D assembly 200 from the mounting surface assembly 100 is received (e.g., from a remote control device 410 operated by a user 400, as shown in FIG. X), the controller 120 triggers simultaneous rotation of the holding brackets 150A and 150B from the lowered/closed position back to the raised/open position (FIG. 1A) to release/unlock the U&D assembly 200 from the mounting surface assembly 100.

Figure 2A:
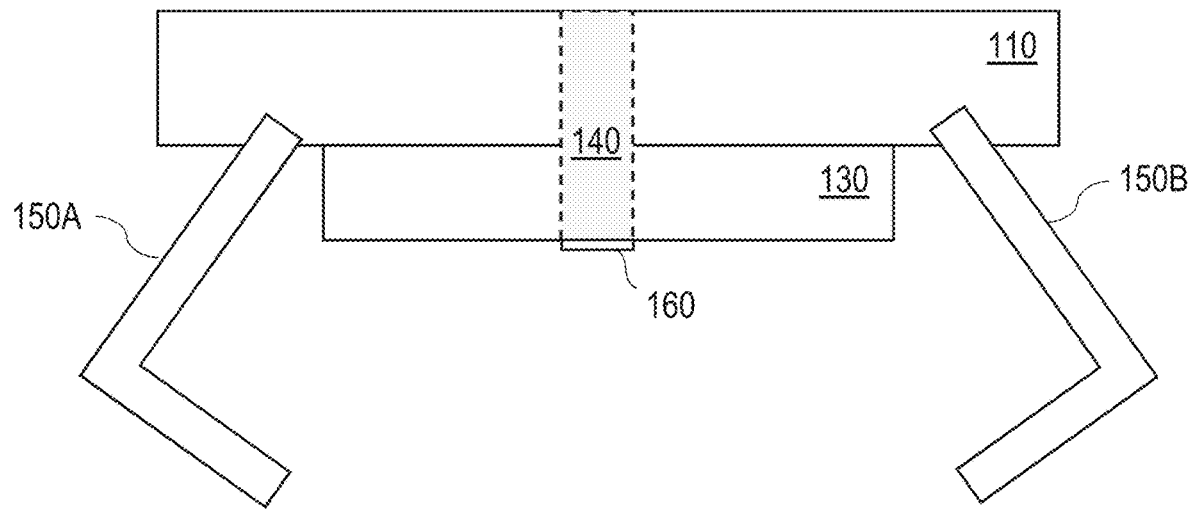
FIG. 2A illustrates a front view of the mounting surface assembly, in accordance with one or more embodiments.

FIG. 2A illustrates a front view of the mounting surface assembly 100, in accordance with one or more embodiments. In one embodiment, the mounting surface assembly 100 comprises an input/output (I/O) connector 140 including a mating member 160 for transmitting power and/or control signals to one or more components of the mounting surface assembly 100 and/or one or more components of the U&D assembly 200 when the U&D assembly 200 is coupled to the base unit 110. The mating member 160 may extend/protrude from the coupling member 130 (as shown in FIG. 2A) or lie flush with, and does not protrude beyond, the coupling member 130.

In one embodiment, the I/O connector member 140 transmits power from the power source 55 (FIG. 1A) to power one or more components of the mounting surface assembly 100 and/or one or more components of the U&D assembly 200 when the U&D assembly 200 is coupled to the base unit 110. In one embodiment, the I/O connector member 140 transmits control signals generated by the controller 120 (FIG. 2C) to control operation of one or more components of the mounting surface assembly 100 (e.g., the holding brackets 150A and 150B, etc.) and/or one or more components of the U&D assembly 200 (e.g., the drone 230, etc.) when the U&D assembly 200 is coupled to the base unit 110.

Figure 2B:
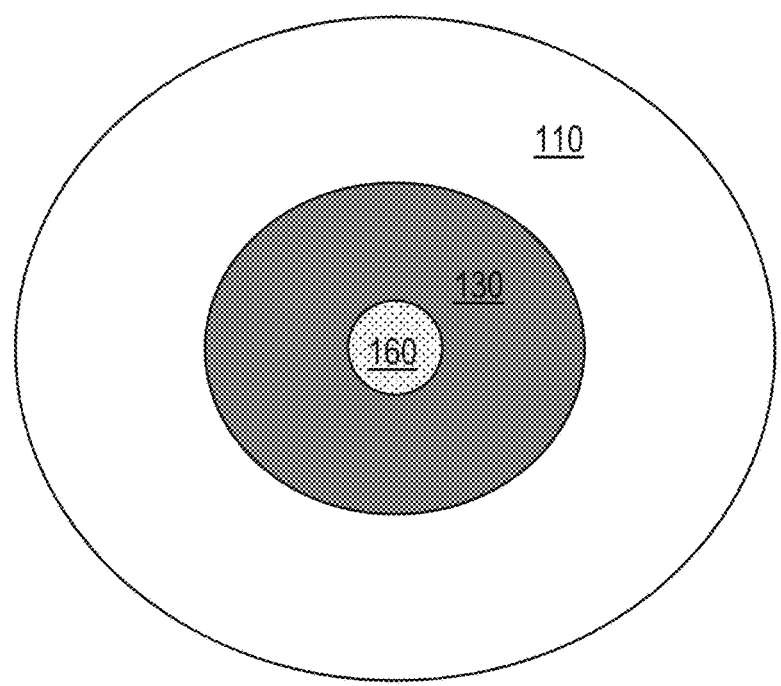
FIG. 2B illustrates a cross-section view of the mounting surface assembly, in accordance with one or more embodiments.

FIG. 2B illustrates a cross-section view of the mounting surface assembly 100, in accordance with one or more embodiments. In one embodiment, the coupling member 130 is positioned about a center of the base unit 110 and extends horizontally across a portion of the base unit 110. In one embodiment, the coupling member 130 has smaller physical dimensions than the base unit 110 (i.e., smaller in size).

In one embodiment, the I/O connector 140 extends vertically through a center of the base unit 110 and the coupling member 130, such that the base unit 110, the coupling member 130, the I/O connector 140, and the mating member 160 are centrally aligned. In one embodiment, the I/O connector member 140 and the mating member 160 have smaller physical dimensions than the coupling member 130 (i.e., smaller in size).

Figure 2C:
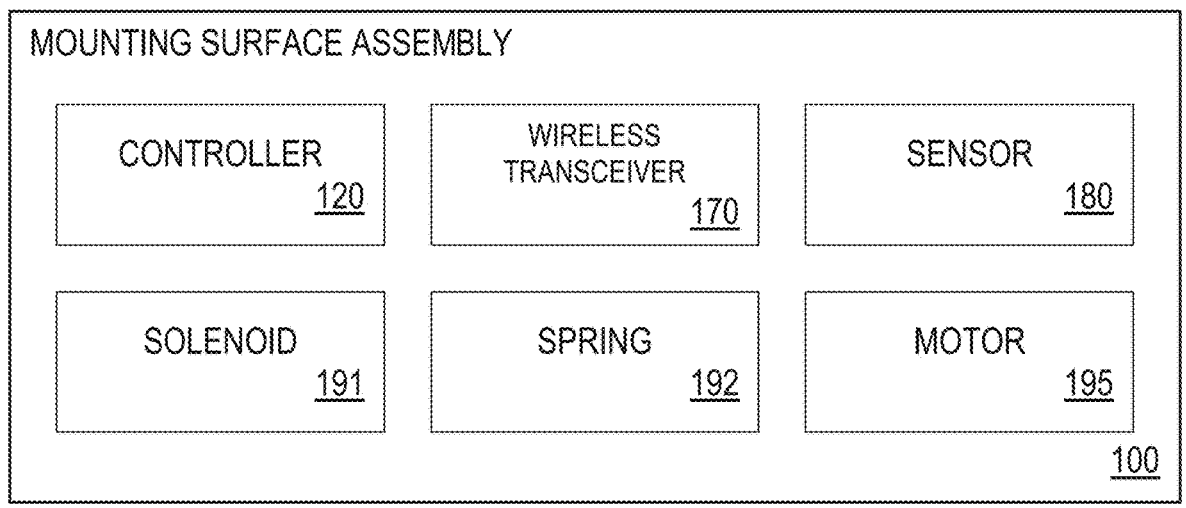
FIG. 2C is a block diagram of one or more example components of the mounting surface assembly, in accordance with one or more embodiments.

FIG. 2C is a block diagram of one or more example components of the mounting surface assembly 100, in accordance with one or more embodiments. As stated above, the mounting surface assembly 100 comprises the controller 120 configured to generate control signals for controlling operation of one or more components of the mounting surface assembly 100 and/or one or more components of the U&D assembly 200 when the U&D assembly 200 is coupled to the base unit 110.

In one embodiment, the mounting surface assembly 100 comprises a wireless transceiver 170 configured to receive and transmit wireless signals. Wireless signals received by/transmitted from the wireless transceiver 170 may comprise control signals for controlling operation of the apparatus 10. For example, the wireless transceiver 170 may receive wireless signals from a remote control device 410 (FIG. X) operated by a user 400 (e.g., control signals from the remote control device 410 to trigger release of the U&D assembly 200 from the mounting surface assembly 100, etc.). The wireless signals received may be forwarded to the controller 120 for processing. The wireless transceiver 170 may transmit wireless signals to a component of the U&D assembly 200 when the U&D assembly 200 is uncoupled from the base unit 110. (e.g., control signals from the controller 120 to pilot the drone 230, etc.). In one embodiment, the wireless transceiver 170 comprises an infrared (IR) transceiver for receiving IR signals.

In one embodiment, the mounting surface assembly 100 comprises one or more sensors 180. Examples of different types of sensors 180 include, but are not limited to, a sensor for detecting direct physical contact between the coupling members 130 and 212, etc.

In one embodiment, the controller 120 is configured to determine the U&D assembly 200 is coupled to the base unit 110 based on detecting direct physical contact between the coupling members 130 and 212 (e.g., using the one or more sensors 180). In response to detecting direct physical contact between the coupling members 130 and 212, the controller 120 triggers simultaneous rotation of the holding brackets 150A and 150B from the raised/open position to the locked/closed position to engage with the holder member 213 and lock the U&D assembly 200 to the mounting surface assembly 100.

In one embodiment, controller 120 actuates one or more solenoids 191 to release/stretch one or more springs 192 that cause the holding brackets 150A and 150B to simultaneously rotate. In another embodiment, the controller 120 actuates one or more motors 195 that cause the holding brackets 150A and 150B to simultaneously rotate.

Figure 3A:
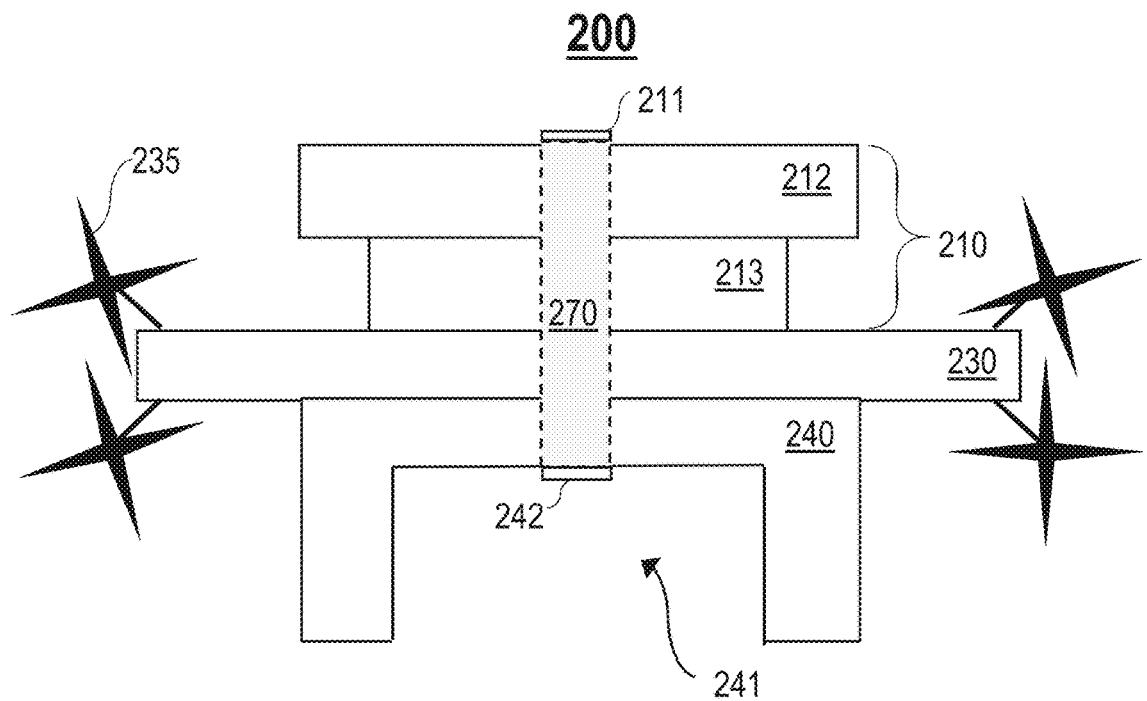
FIG. 3A illustrates a front view of the U&D assembly, in accordance with one or more embodiments.

FIG. 3A illustrates a front view of the U&D assembly 200, in accordance with one or more embodiments. As shown in FIG. 3A, the utility payload 250 is removed from the U&D assembly 200. In one embodiment, the U&D assembly 200 comprises an I/O connector 270 for receiving power and/or control signals from the mounting surface assembly 100 when the U&D assembly 200 is coupled to the base unit 110.

In one embodiment, the I/O connector 140 extends vertically through a center of the coupling member 212, the holder member 213, the drone 230, and the utility holder 240, such that the coupling member 212, the holder member 213, the drone 230, the utility holder 240, and the I/O connector 270 are centrally aligned.

In one embodiment, the I/O connector 270 includes a first mating member 211 and a second mating member 242 located at opposing, distal ends of the I/O connector 270. The first mating member 211 may extend/protrude from the coupling member 212 (as shown in FIG. 3A) or lie flush with, and does not protrude beyond, the coupling member 212. The first mating member 211 is mateable with the mating member 160 of the I/O connector 140 to receive power and/or control signals from the mounting surface assembly 100. The second mating member 242 may extend/protrude from the utility holder 240 (as shown in FIG. 3A) or lie flush with, and does not protrude beyond, the utility holder 240. The second mating member 242 is mateable with a mating member (not shown) of the utility payload 250 to deliver power and/or control signals to the utility payload 250.

In one embodiment, in response to detecting direct physical contact between the coupling members 130 and 212, the controller 120 triggers the mating member 160 of the I/O connector 140 to mate with the first mating member 211 of the I/O connector 270. The controller 120 may also trigger the second mating member 242 of the I/O connector 270 to mate with the mating member of the utility payload 250. When the mating members are mated, the I/O connector 270 receives power and/or control signals from the I/O connector 140, and forwards the power and/or control signals to one or more components of the U&D assembly 200, such as the drone 230 and/or the utility payload 250. For example, power received may be used to power/charge the drone 230 and/or the utility payload 250. For example, control signals received may be used to control operation of the drone 230 and/or the utility payload 250.

In one embodiment, the utility holder 240 includes a recess 241 that forms a receptacle shaped for receiving and retaining/maintaining the utility payload 250. The utility holder 240 may further include fasteners like screws, snaps, treads, or any other temporary mechanical connections that further mate the utility payload 250 to the utility holder 240. Each of these fasteners may be used alone or in combination with other connecting mechanisms.

In one embodiment, the coupling member 212 is positioned above and about a center of the holder member 213, extending horizontally across the holder member 213. In one embodiment, the coupling member 212 has larger physical dimensions than the holder member 213 (i.e., larger in size).

Figure 3B:
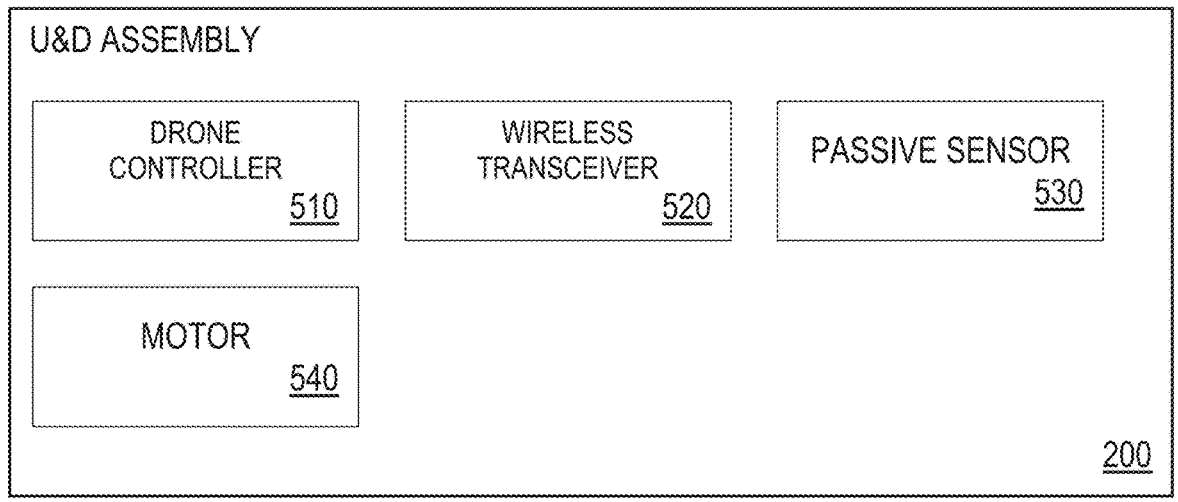
FIG. 3B is a block diagram of one or more example components of the U&D assembly, in accordance with one or more embodiments.

FIG. 3B is a block diagram of one or more example components of the U&D assembly 200, in accordance with one or more embodiments. In one embodiment, the U&D assembly 200 comprises a drone controller 510 for controlling operation of the drone 230. As described in detail later herein, the drone controller 510 facilitates manual piloting or automatic piloting of the drone 230. In one embodiment, control signals received from the mounting surface assembly 100 via the I/O connector 270 may be forwarded to the drone controller 510 for processing.

In one embodiment, the U&D assembly 200 comprises a wireless transceiver 520 configured to receive and transmit wireless signals. Wireless signals received by the wireless transceiver 520 may comprise control signals for controlling operation of the drone 230. For example, the wireless transceiver 520 may receive wireless signals from a remote control device 410 (FIG. X) operated by a user 400 (FIG. X) who is manually piloting the drone 230. The wireless signals received are forwarded to the drone controller 510 for processing. In one embodiment, the wireless transceiver 520 comprises an infrared (IR) transceiver for receiving IR signals.

In one embodiment, the U&D assembly 200 comprises one or more passive sensors 530. The one or more passive sensors 530 may be included in the utility payload 250. Examples of different types of passive sensors 530 include, but are not limited to, a passive sensor for detecting smoke, a passive sensor for detecting carbon monoxide, etc.

In one embodiment, the U&D assembly 200 comprises a set of motors 540 for powering the propellers 235 of the drone 230. In one embodiment, each propeller 235 has a corresponding motor 540 that powers the propeller 235. The motors 540 may be included in the drone 230.

Figure 4A:
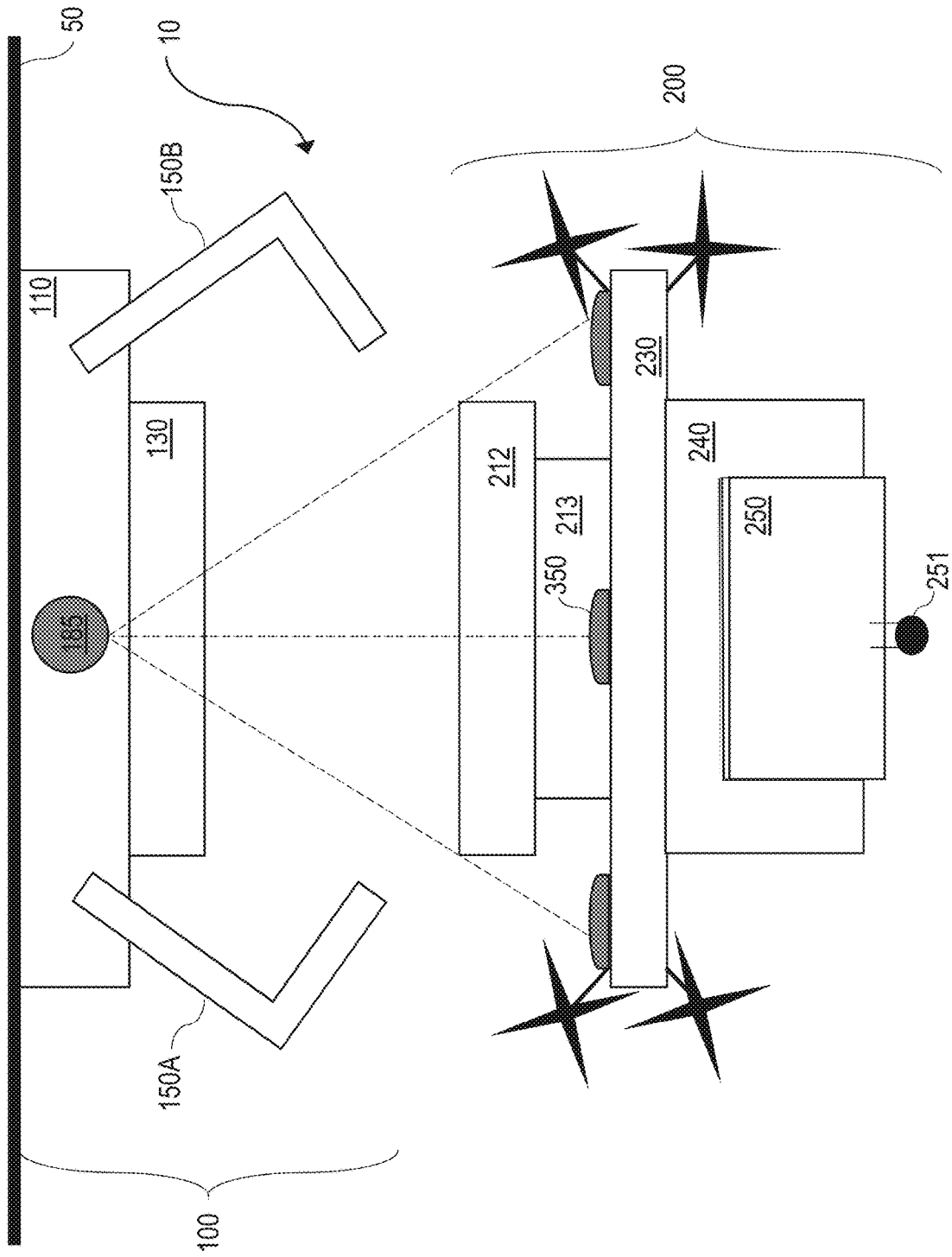
FIG. 4A illustrates an example drone-based utility apparatus that supports beacon-based triangulation, in one or more embodiments.

FIG. 4A illustrates an example drone-based utility apparatus 10 that supports beacon-based triangulation, in one or more embodiments. As stated above, in one embodiment, the drone 230 may be automatically piloted using beacon-based triangulation. To facilitate beacon-based triangulation, the mounting surface assembly 100 comprises a beacon 185 for emitting signals, and the U&D assembly 200 comprises a set of beacon sensors 350 for detecting the signals emitted by the beacon 185. In one embodiment, the beacon 185 is positioned on an exterior of the base unit 110. In one embodiment, the beacon sensors 350 reside on the drone 230.

The drone controller 510 is configured to determine a location of the mounting surface assembly 100 by triangulating the signals detected by the beacon sensors 350. Based on the location determined, the drone controller 510 is configured to automatically pilot the drone 230 to take off from a current location (e.g., the ground/floor, a table, etc.) and ascend vertically towards the mounting surface assembly 100 to couple the U&D assembly 200 to the base unit 110.

Figure 4B:
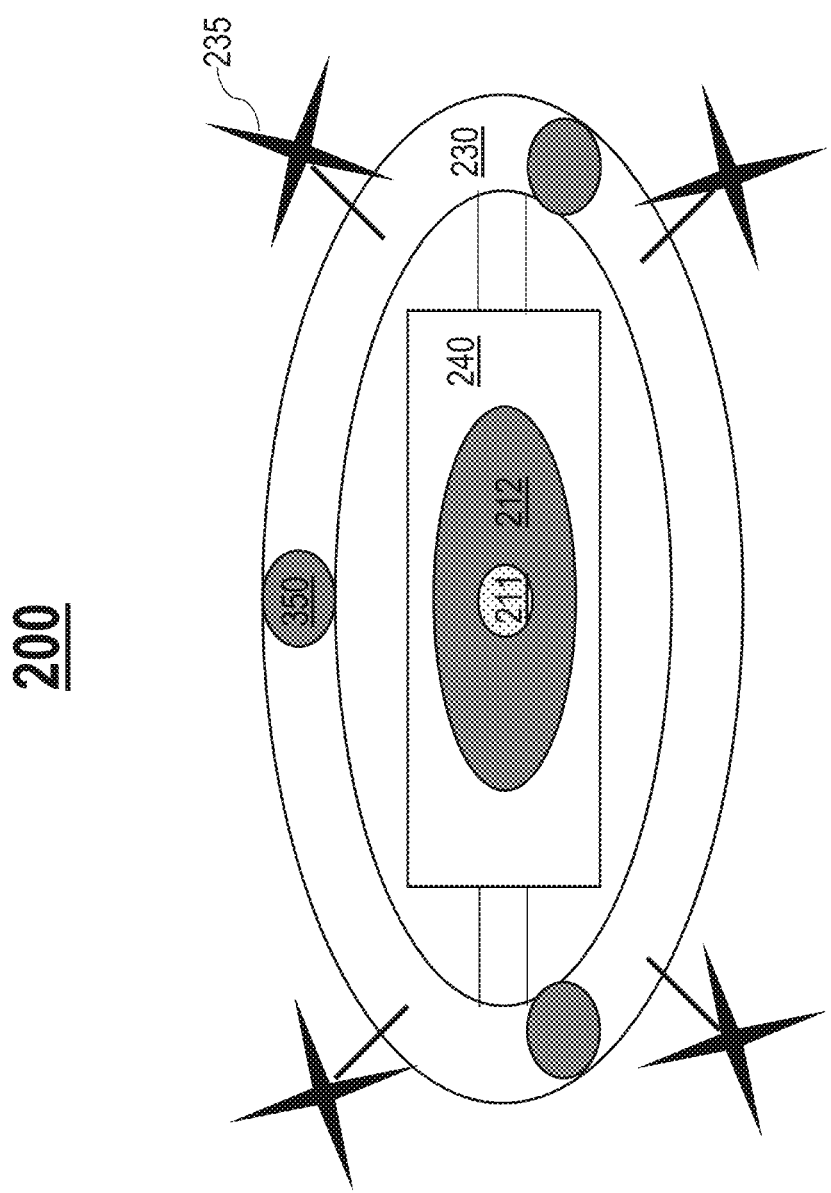
FIG. 4B illustrates a top view of a U&D assembly that supports beacon-based triangulation, in one or more embodiments.

FIG. 4B illustrates a top view of the U&D assembly 200 that supports beacon-based triangulation, in one or more embodiments. In one embodiment, the beacon sensors 350 are positioned on the drone 230 in a spatial/geometric arrangement suitable for triangulation.

FIG. 5 illustrates descent of the drone 230 after the U&D assembly 200 is released/unlocked from the mounting surface assembly 100, in one or more embodiments. Assume one or more components of the U&D assembly 200 require replacement (e.g., the indicator light 251 is flashing, the apparatus 10 emits a warning sound, etc.). To access the U&D assembly 200 and replace the components requiring replacement, the user 400 may utilize a remote control device 410 to wirelessly signal the apparatus 10 to release/unlock of the U&D assembly 200 from the mounting surface assembly 100. The wireless transceiver 170 receives and forwards the wireless signal to the controller 120 for processing. In response to receiving the wireless signal, the controller 120 causes the drone 230 to start. The controller 120 further triggers simultaneous rotation of the holding brackets 150A and 150B from the lowered/closed position to the raised/open position (FIG. 1A) to release/unlock the U&D assembly 200 from the mounting surface assembly 100.

When the U&D assembly 200 is released/unlocked, the user 400 may utilize the same remote control device 410 or another remote control device 410 to manually pilot the drone 230 to a desired landing location (e.g., the ground/floor 450, a table, etc.). For example, the user 400 may control the speed and/or direction of the descent and landing of the drone 230 (e.g., manually pilot the drone 230 to slowly descend vertically and land on the ground). The wireless transceiver 520 receives and forwards control signals from the remote control device 410 to the drone controller 510 for processing. The drone controller 510 controls the drone 230 in accordance with the control signals received.

In one embodiment, the drone 230 may be automatically piloted to a desired landing location using beacon-based triangulation. For example, a beacon may be positioned at the desired landing location to emit signals that the beacon sensors 350 on the drone 230 may detect. The drone controller 510 may determine the desired landing location by triangulating the signals detected, and automatically pilot the drone 230 to the desired landing location.

Upon the drone 230 landing at the desired landing location, the drone 230 may be powered off for safety. The user 400 can then safely access the U&D assembly 200 to replace one or more components of the U&D assembly 200. For example, the user 400 may replace batteries of the utility payload 250 or may replace the entire utility payload 250 itself.

FIG. 6 illustrates ascent of the drone 230 to lock the U&D assembly 200 to the mounting surface assembly 100, in one or more embodiments. To mount the U&D assembly 200 to the mounting surface 50 (e.g., mounting for the first time or re-mounting after replacing one or more components of the U&D assembly 200), the drone 230 may be manually piloted or automatically piloted towards the mounting surface assembly 100. For example, a user 400 may utilize a remote control device 410 to manually pilot the drone 230 towards the mounting surface assembly 100. For example, the user 400 may control the speed and/or direction of the take off and ascent of the drone 230 (e.g., manually pilot the drone 230 to take off from a current location, such as the ground/floor 450, slowly ascend vertically towards the mounting surface assembly 100). The wireless transceiver 520 receives and forwards control signals from the remote control device 410 to the drone controller 510 for processing. The drone controller 510 controls the drone 230 in accordance with the control signals received.

In one embodiment, the drone 230 may be automatically piloted towards the mounting surface assembly 100 using beacon-based triangulation. For example, the beacon sensors 350 on the drone 230 may detect signals emitted from the beacon 185 on the mounting surface assembly 100. The drone controller 510 may determine the location of the mounting surface assembly 100 by triangulating the signals detected, and automatically pilot the drone 230 to the mounting surface assembly 100.

The coupling member 130 of the mounting surface assembly 100 pulls/attracts the coupling member 212 of the U&D assembly 200 when the coupling members 130 and 212 are within proximity of each other. In response to detecting direct physical contact between the coupling members 130 and 212, the controller 120 triggers simultaneous rotation of the holding brackets 150A and 150B from the raised/open position to the locked/closed position to engage the holder member 213 and lock the U&D assembly 200 to the mounting surface assembly 100. The controller 120 further triggers the mating member 160 of the mounting surface assembly 100 to mate with the first mating member 211 of the U&D assembly 200. When the mating members are mated, the I/O connector 270 of the U&D assembly 200 receives power and/or control signals from the mounting surface assembly 100. Power from the power source 55 (FIG. 1A) may be used to charge the drone 230 and/or the utility payload 250. Control signals from the controller 120 may be used to control operation of the drone 230 and/or the utility payload 250. For example, the drone controller 510 may power off the drone 230 in accordance with the control signals received.

In one embodiment, the mounting surface assembly 100 may be installed/affixed to the mounting surface 50 utilizing the drone 230.

Figure 7:
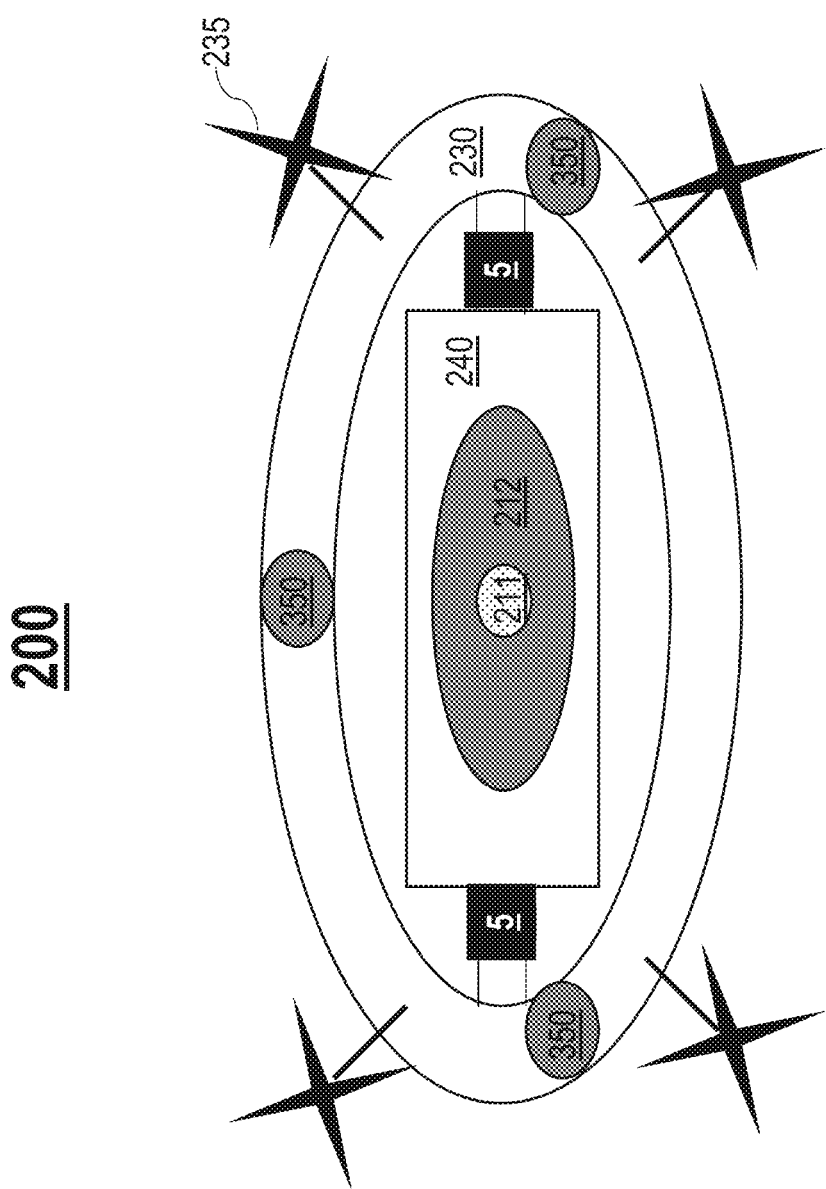
FIG. 7 illustrates a top view of the U&D assembly, wherein the drone is detachable, in one or more embodiments.

FIG. 7 illustrates a top view of the U&D assembly 200, wherein the drone 230 is detachable, in one or more embodiments. In one embodiment, the drone 230 is detachable from the utility holder 240 and the mounting portion 210. Specifically, the drone 230 comprises one or more holders 5 that the utility holder 240 and the mounting portion 210 may be detachably attached to. When the mating member 160 of the mounting surface assembly 100 is mated with the first mating member 211 of the U&D assembly 200, control signals from the controller 120 may be used to cause the drone 230 to detach from the utility holder 250 and the mounting portion 210. For example, the drone controller 510 may actuate the holders 5 to release utility holder 240 and cause the drone 230 to fly away upon release of the utility holder 240.

Figure 8:
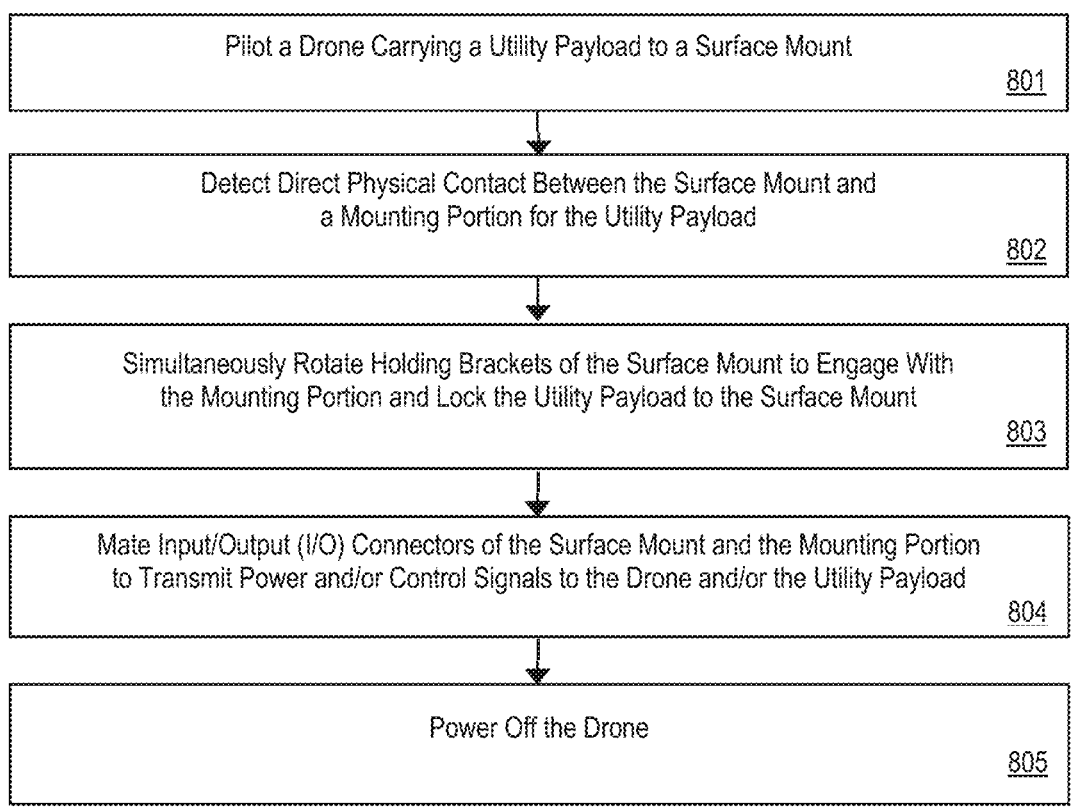
FIG. 8 illustrates a flowchart of an example process for mounting a utility payload to a surface mount, in accordance with an embodiment of the invention.

FIG. 8 illustrates a flowchart of an example process 800 for mounting a utility payload to a surface mount, in accordance with an embodiment of the invention. In process block 801, pilot a drone (e.g., the drone 230) carrying a utility payload (e.g., the utility payload 250) to a surface mount (e.g., the mounting surface assembly 100). In process block 802, detect direct physical contact between the surface mount and a mounting portion for the utility payload (e.g., direct physical contact between the coupling members 130 and 212). In process block 803, simultaneously rotate holding brackets (e.g., the holding brackets 150A and 150B) of the surface mount to engage with the mounting portion (e.g., the holder member 213) and lock the utility payload to the surface mount. In process block 804, mate I/O connectors of the surface mount and the mounting portion (e.g., the mating members 160 and 211) to transmit power and/or control signals to the drone and/or the utility payload. In process block 805, power off the drone.

In one embodiment, process blocks 801-805 may be performed by one or more components of the mounting surface assembly 100, the U&D assembly 200, and the remote control device 410.

Figure 9:
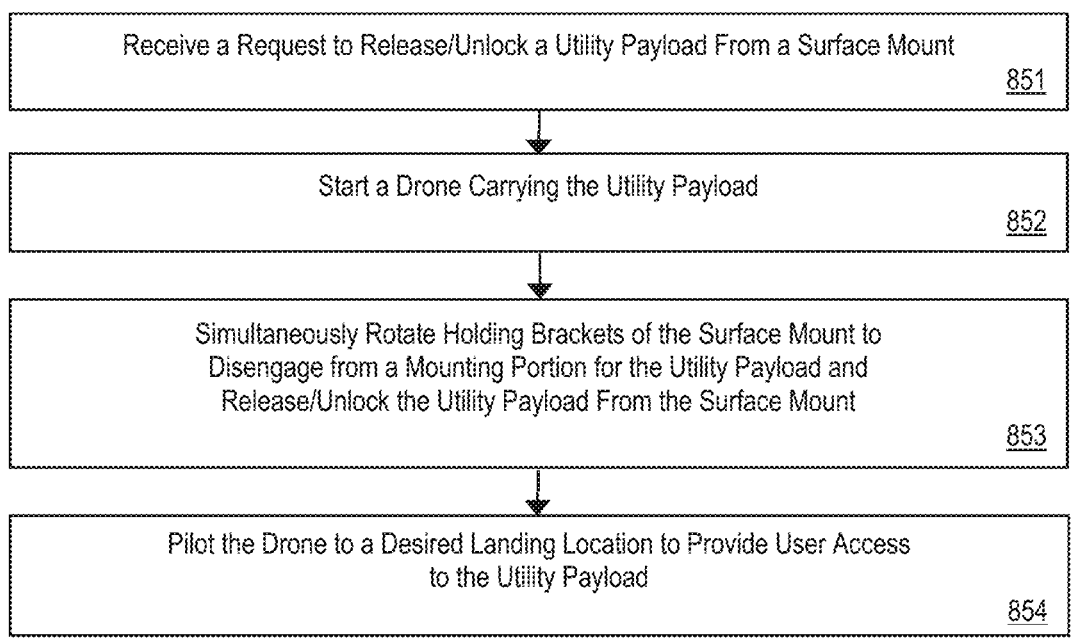
FIG. 9 illustrates a flowchart of an example process for releasing a utility payload from a surface mount, in accordance with an embodiment of the invention.

FIG. 9 illustrates a flowchart of an example process 850 for releasing a utility payload from a surface mount, in accordance with an embodiment of the invention. In process block 851, receive a request to release/unlock a utility payload (e.g., the utility payload 250) from a surface mount (e.g., the mounting surface assembly 100). In process block 852, start a drone (e.g., the drone 230) carrying the utility payload. In process block 853, simultaneously rotate holding brackets (e.g., the holding brackets 150A and 150B) of the surface mount to disengage from a mounting portion (e.g., the holder member 213) for the utility payload and release/unlock the utility payload from the surface mount. In process block 854, pilot the drone to a desired landing location to provide user access to the utility payload.

In one embodiment, process blocks 851-854 may be performed by one or more components of the mounting surface assembly 100, the U&D assembly 200, and the remote control device 410.

Figure 10:
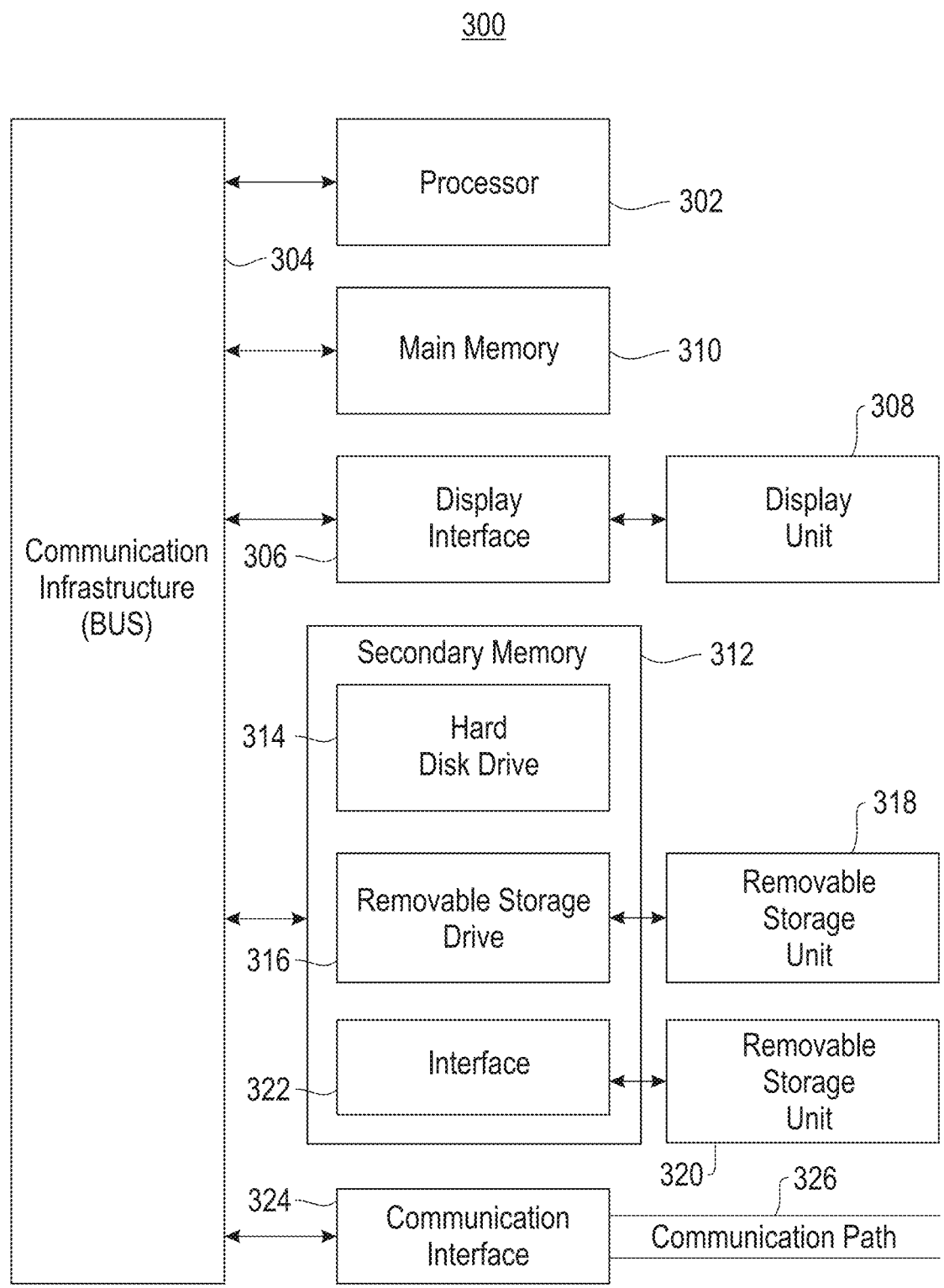
FIG. 10 is a high level block diagram showing an information processing system useful for implementing an embodiment of the present invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a request to release a utility holder detachably mounted to a surface mount, wherein the utility holder maintains a utility payload, and a set of rotatable holding brackets is coupled to the surface mount in a pivotable fashion to engage the holding brackets with the utility holder in order to mount the utility holder to the surface mount; and
in response to receiving the request:
powering on a drone attached to the utility holder; and
releasing the utility holder from the surface mount by actuating rotation of the holding brackets to disengage the holding brackets from the utility holder, enabling the drone to transport the utility holder from the surface mount to a desired location.

2. The method of claim 1, wherein the request is wirelessly received from a remote control device operated by a user.

3. The method of claim 1, wherein:
the surface mount comprises:
a base unit that is affixable to a mounting surface; and
a first coupling member; and
the utility holder comprises:
a mounting portion including a second coupling member and a holder member.

4. The method of claim 3, wherein the mounting surface is a ceiling.

5. The method of claim 3, wherein the first coupling member attracts the second coupling member to couple the utility holder to the base unit and mount the utility holder to the surface mount when the coupling members are within proximity of each other.

6. The method of claim 5, wherein the coupling members comprise magnets of opposite polarities.

7. The method of claim 3, wherein the holding brackets engage with the holder member to lock the utility holder to the base unit and mount the utility holder to the surface mount.

8. The method of claim 7, wherein actuating rotation of the holding brackets to release the utility holder from the surface mount comprises:
simultaneously rotating the holding brackets to disengage the holding brackets from the holder member and release the utility holder from the surface mount.

9. The method of claim 1, wherein the drone is manually pilotable to the desired location via a remote control device operated by a user.

10. The method of claim 1, wherein the utility payload comprises a detector.

11. The method of claim 1, wherein the detector comprises one of a smoke detector or a carbon monoxide detector.

* * * * *